United States Patent [19]
Washburn et al.

[11] Patent Number: 5,438,995
[45] Date of Patent: Aug. 8, 1995

[54] METHOD FOR OBTAINING TEMPORAL EQUITY WITH VARYING VECTOR LOCATIONS

[75] Inventors: Michael J. Washburn; Stephen M. Peshman, both of New Berlin; Chandler A. Johnson, III, Oconomowoc, all of Wis.

[73] Assignee: General Electric Company, Milwaukee, Wis.

[21] Appl. No.: 343,155

[22] Filed: Nov. 22, 1994

[51] Int. Cl.⁶ ............................................. A61B 8/00
[52] U.S. Cl. ................................... 128/661.01; 73/626
[58] Field of Search ................. 128/660.01, 660.07, 128/660.08, 661.01, 662.02; 73/601, 602, 625, 626

[56] References Cited

U.S. PATENT DOCUMENTS

| | | | |
|---|---|---|---|
| 4,733,562 | 3/1988 | Saugeon | 73/626 |
| 4,917,097 | 4/1990 | Proudian et al. | 128/661.01 |
| 5,345,939 | 9/1994 | Engeler et al. | 73/602 |

*Primary Examiner*—George Manuel
*Attorney, Agent, or Firm*—B. Joan Haushalter; John H. Pilarski

[57] ABSTRACT

In a method for obtaining temporal equity of multiple images for ultrasound imaging equipment, a vector set is determined for each of the multiple images, representative of vectors to be aligned. A plurality of independent weights is then calculated for each image based on the vector sets. The plurality of calculated independent weights is used to determine a firing sequence which provides temporal equity of the multiple images.

6 Claims, 1 Drawing Sheet

METHOD FOR OBTAINING TEMPORAL EQUITY WITH VARYING VECTOR LOCATIONS

TECHNICAL FIELD

The present invention relates to ultrasound imaging and, more particularly, to a method for obtaining temporal equity of ultrasound B and color images with varying vector locations.

BACKGROUND ART

Ultrasound machines which support color flow imaging overlay B mode and color flow mode images. Some ultrasound machines fire an entire B image and an entire color image and then overlay them. One problem with this method of firing is that the B and the color images do not always match when displayed, due to anatomical or patient movement.

In other ultrasound machines, the B and color data are fired in a fixed fashion, in which some number of B mode firings are made before or after each color grouping. In this instance, the B vector spacings are dependent on the color vector spacings. That is, the B and color vector spacings must be multiples.

The time difference between B and color data associated with the same anatomy is essential to the quality of the image, especially in cases where there is anatomical or patient motion. When the entire B image and the entire color image are fired separately and overlaid, the time difference is the time it takes to fire the B image or the time it takes to fire the color image. When the B and color data are fired in a fixed fashion, restrictions are placed on the B and color vector locations so that the desired results will be provided.

It would be desirable then to have a firing recipe wherein temporal equity is obtained between the ultrasound B and color images, in spite of varying vector locations.

SUMMARY OF THE INVENTION

This need is met by the method of the present invention wherein temporal equity of ultrasound B and color images with varying vector locations is achieved. The present invention provides for a firing sequence wherein the B and color data are kept closely tied in time, and the firing is independent of B and color vector locations.

In accordance with one aspect of the present invention, a firing sequence method is used to obtain temporal equity of multiple images for ultrasound imaging equipment. A vector set is determined for each of the multiple images, representative of vectors to be aligned. A plurality of independent weights is then calculated for each image based on the vector sets. The plurality of calculated independent weights is used to determine a firing sequence which provides temporal equity of the multiple images.

Accordingly, it is an object of the present invention to achieve temporal equity of ultrasound B and color images for ultrasound imaging equipment. It is a further object of the present invention to determine a firing sequence which keeps the B and color data closely tied in time and which works independent of the B and color vector locations.

Other objects and advantages of the invention will be apparent from the following description, the accompanying drawings and the appended claims.

DETAILED DESCRIPTION OF THE PREFERRED EMBODIMENTS

The present invention determines a firing sequence which keeps the B and color data closely tied in time and works independent of the B and color vector locations.

The B image is broken into groups which contain individual vectors and the color image is broken into groups of vectors which are interleaved based on velocity scale to form a color group. The number of individual color vectors which make a color group is equal to the interleaving. That if, two individual color vectors make a group is the interleaving is two. Likewise, if the interleaving is three, then three color vectors make a color group.

There is a weight associated with the firing of each B and color group as well as weights associated with the start and end of the B and color images. A B image is comprised of all the B vectors, and a color image is comprised of all the color vectors, or all the color groups. The initial B and color weights are set to the B and color start weights. Each time a B or color group is fired or a B or color image is completed, the associated weight is added to the B or color weight total. At any given time, a group from the vector type (B or color) with the lowest weight total is fired next.

Figure 1:
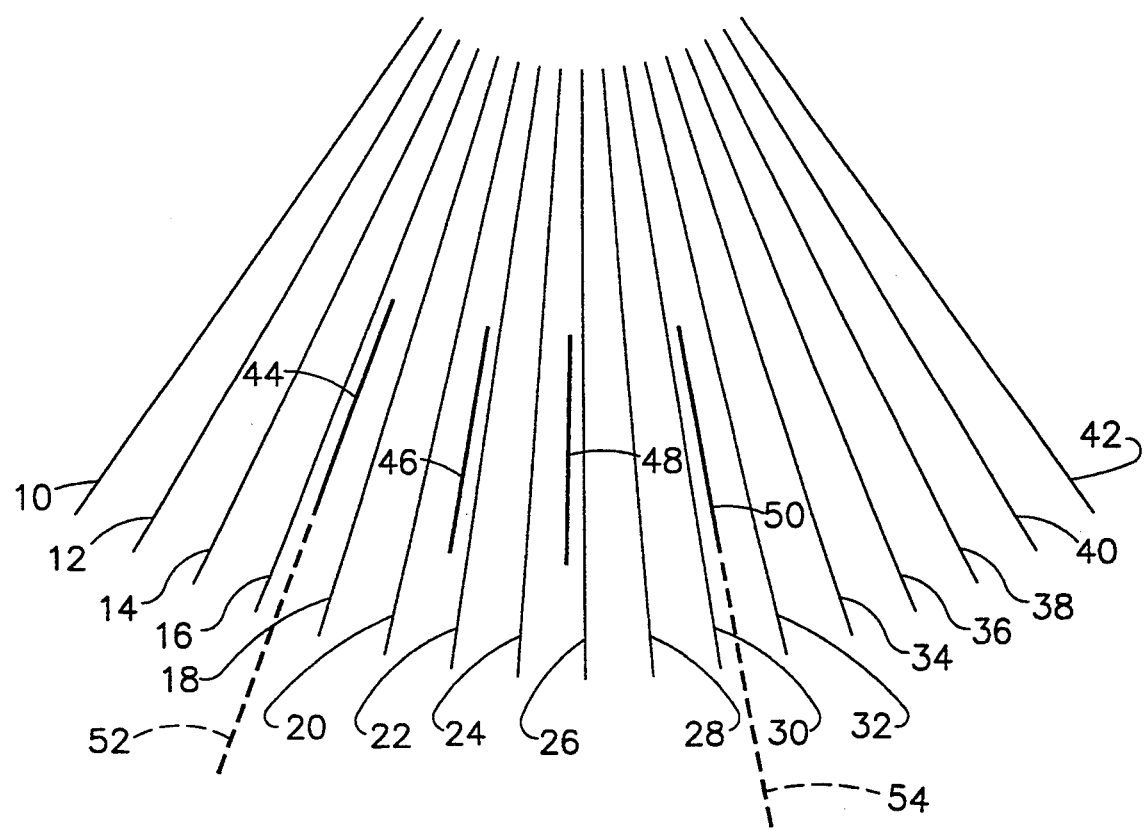
FIG. 1 is a representative B and color image.

The six weights, termed $B_{start}$, $B_{group}$, $B_{end}$, $C_{start}$, $C_{group}$, and $C_{end}$, can also be determined in accordance with the present invention. Assuming the color interleaving in FIG. 1 is equal to two, that is, a color group is comprised of two individual color vectors, and that the scan direction is from left to right, then weight calculations can be made as follows:

B and color group weights:
  $B_{group}$=number of color vectors in the color wedge i.e., $B_{group}$=4)
  $C_{group}$=number of B vectors with (inclusively) the color wedge multiplied by the color interleaving (i e $C_{group}$=7*2=14)

Figure 2:
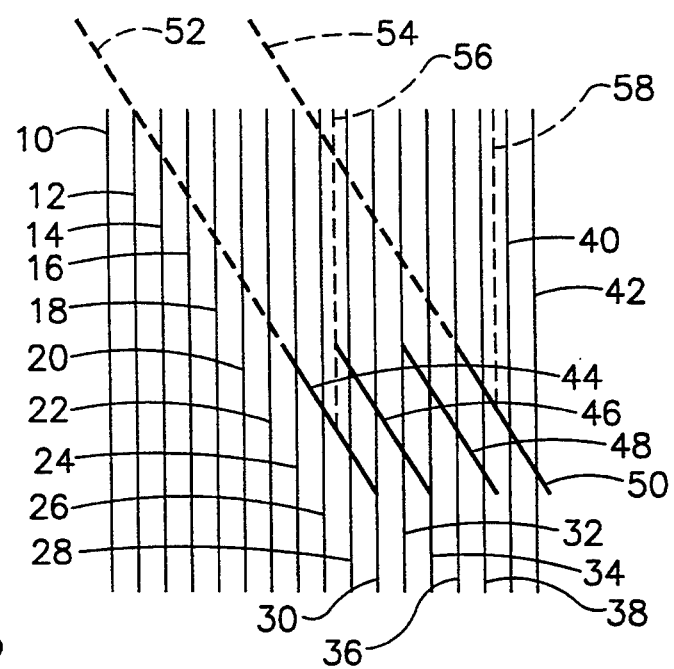
FIG. 2 is a translation of a color wedge when color firings are not in the same direction as the B firings.

The C group weight uses the number of B vectors in the color wedge. The color wedge in FIG. 1 is defined by the left-most and right-most color vectors. In FIG. 2, the color wedge is also defined by the left-most and right-most color vectors, but counting the number of B vectors within the wedge is difficult since the B vectors are not parallel to the color vectors. Therefore, the color wedge is transferred, as shown in FIG. 2, and the boundaries, indicated by dashed lines in FIG. 2, are used to represent the color wedge when the number of B vectors in the color wedge is counted.

B and color start weights:
  $B_{start}$=0 (assuming at least one B vector always precedes the first color vector)
  $C_{start}$=number of B vectors preceding the first color vector multiplied by $B_{group}$+1 (i.e., $C_{start}$=4*4+1=17)

B and color end weights:
  $B_{end}$=number of color interleaved groups multiplied by $C_{group}$ (i.e., $B_{end}$=2*14 =28)
  $C_{end}$=number of B groups multiplied by $B_{group}$ (i.e. 17*4 =68)

In FIG. 1, the B vectors are indicated by reference numbers 10, 12, 14, 16, 18, 20, 22, 24, 26, 28, 30, 32, 34, 36, 38, 40, 42; and the color vectors are indicated by reference numbers 44, 46, 48, 50. Once the six weights are calculated according to the equations above, then at any given instant, a group from the vector type (B or color) with the lowest weight total is fired next.

Initially, $B_{weight} = B_{start} = 0$ and $C_{weight} = C_{start} = 17$, based on FIG. 1 and the description preceding. Since $B_{weight} < C_{weight}$, a B group, i.e., an individual B vector, shown as vector 10 in FIG. 1, is fired. Now $B_{weight} = 4$, based on the equation that states that $B_{weight}$ (previous) $+ B_{group} = B_{weight}$ (new); and $C_{weight} = 17$. Since $B_{weight}$ is still less than $C_{weight}$, another B group, vector 12, is fired. Now $B_{weight} = 8$ and $C_{weight} = 17$. B vectors continue to be fired in sequence until $B_{weight}$ is greater than $C_{weight}$. When the C group has the lower weight total, then a C group vector type is fired next. The first color group vector firing is comprised of two vectors, vectors 44 and 46.

When the B and color image of FIG. 1 is complete, firing can continue to the next displayed image. After the final firing in FIG. 1, $B_{weight}$ has a value that is seventeen less than the value of $C_{weight}$ (113−96=17), which is exactly the circumstance initially, where $B_{weight} = 0$ and $C_{weight} = 17$. Hence, the same firing sequence will occur over and over again.

The approach according to the present invention and as illustrated in the embodiment discussed above, is particularly adaptable for use with sector and curved-linear probes, as well as linear probes where the B and color flow (CF) images are fired in essentially the same directions.

Referring now to FIG. 2, in cases where the B and color image are not fired in the same direction, an assumption must be made. The assumption made is that the midpoint of the color region of interest is the area of highest interest to the user. The midpoint of the color wedge, i.e., the color region of interest, is projected to the probe face parallel to the B vectors to create a translated color wedge which is then used for the same calculations as above. In FIGS. 1 and 2, the left side of the color wedge is indicated by dashed line 52, and the right side of the color wedge is indicated by dashed line 54. Dashed lines 56 and 58 indicate the boundary to determine the number of B vectors within the color wedge and the number of B vectors before the first color vector.

Temporal equity of multiple images for ultrasound imaging equipment is obtained according to the present invention. The multiple images may comprise multiple B images or at least one B image and at least one color image. Initially, a vector set for each of the multiple images is determined. The vector set includes a vector spacing and image start and stop positions for each of the multiple images, and is representative of vectors to be aligned. A plurality of independent weights, independent of vector spacing, are then calculated for each of the multiple images, based on the vector sets. The independent weights calculations, as specified above, include a start weight for each of the multiple images, a vector weight for each vector within each of the multiple images, and an end weight for each of the multiple images. A firing sequence which provides temporal equity of the multiple images is determined using the plurality of calculated independent weights. The firing sequence works independent of the B and color vector locations. Finally, the present invention provides the capability of determining what vector from which image is to be fired next in a sequence of firings.

The invention has been described in detail with particular reference to certain preferred embodiments thereof, but it will be understood that modifications and variations can be effected within the spirit and scope of the invention.

We claim:

1. A method for obtaining temporal equity of multiple images for ultrasound imaging equipment, comprising the steps of:

determining a vector set for each of the multiple images, which includes a vector spacing and image start and stop positions for each of the multiple images, to provide vector sets representative of vectors to be aligned; and calculating a plurality of independent weights for each of the multiple images based on the vector sets;

using the plurality of calculated independent weights to determine a firing sequence which provides temporal equity of the multiple images.

2. A method for obtaining temporal equity of multiple images as claimed in claim 1 wherein the step of calculating a plurality of independent weights for each image comprises the steps of:

calculating a start weight for each of the multiple images;

calculating a vector weight for each vector within each of the multiple images; and calculating an end weight for each of the multiple images.

3. A method for obtaining temporal equity of multiple images as claimed in claim 1 wherein the plurality of independent weights calculated are independent of vector spacing.

4. A method for obtaining temporal equity of multiple images as claimed in claim 1 wherein the multiple images comprise multiple B images.

5. A method for obtaining temporal equity of multiple images as claimed in claim 1 wherein the multiple images comprise at least one B image and at least one color image.

6. A method for obtaining temporal equity of multiple images as claimed in claim 1 wherein the step of determining a firing sequence further comprises the step of determining what vector from which image is to be fired next in a sequence of firings.

* * * * *